UNITED STATES PATENT OFFICE.

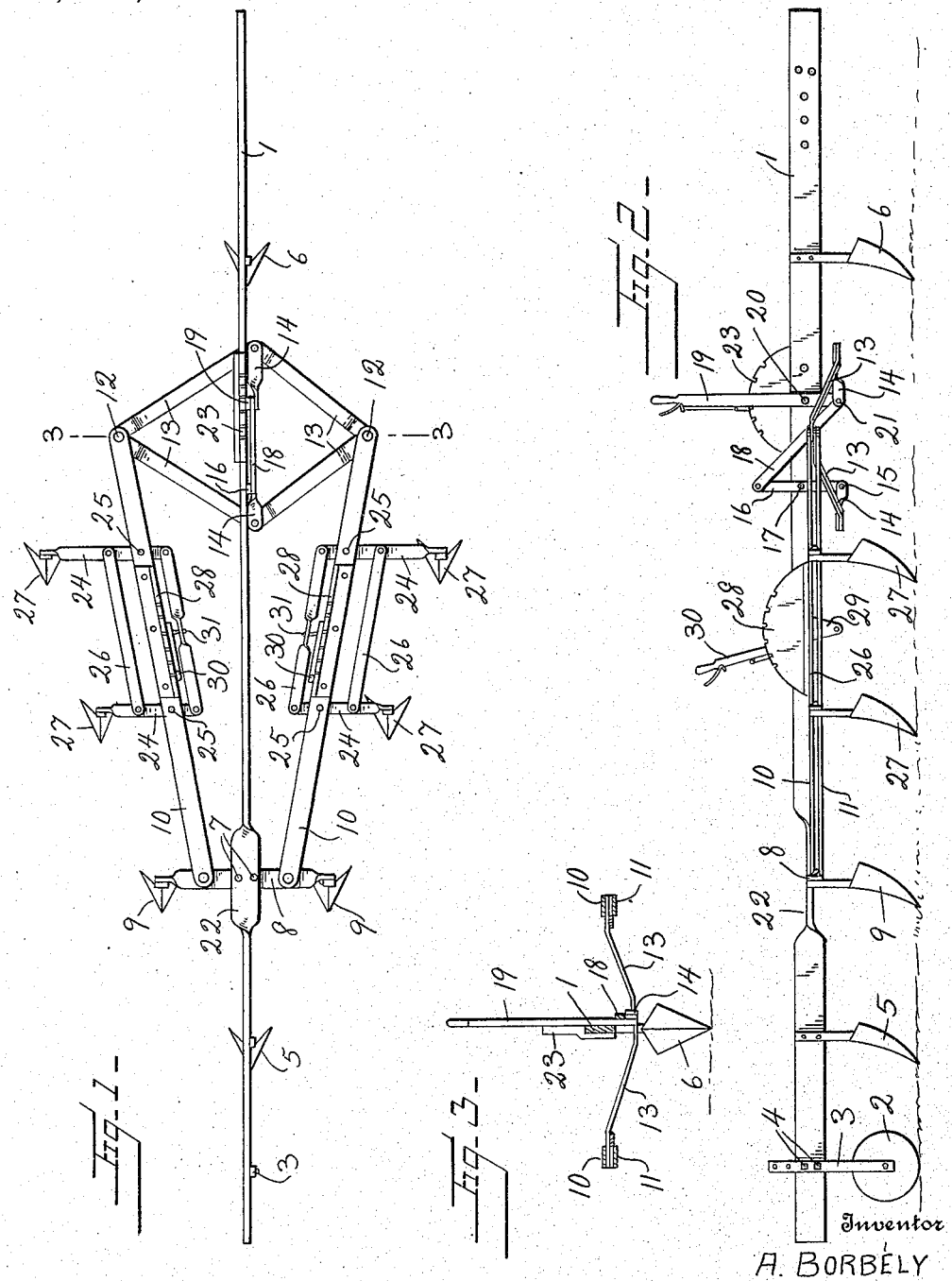

ANTAL BORBÉLY, OF DUBOIS, PENNSYLVANIA.

AGRICULTURAL MACHINE.

1,170,870.  Specification of Letters Patent.  Patented Feb. 8, 1916.

Application filed July 31, 1914. Serial No. 854,323.

*To all whom it may concern:*

Be it known that I, ANTAL BORBÉLY, a subject of the King of Hungary, residing at Dubois, in the county of Clearfield and State of Pennsylvania, have invented certain new and useful Improvements in Agricultural Machines, of which the following is a specification, reference being had therein to the accompanying drawing.

This invention relates to agricultural machines and has for its primary object to provide a machine of this character including two series or gangs of ground working implements arranged upon opposite sides of a central beam, and improved means for simultaneously adjusting the two series of implements with respect to said beam.

The invention has for a more particular object to provide longitudinally extending bars pivotally mounted at their forward ends upon opposite sides of a central beam, a plurality of ground working implements adjustably mounted upon the supporting bars, toggle link connections between the rear ends of said supporting bars, and means mounted upon the beam and coöperatively connected to the toggle links for moving the implement carrying bars inwardly or outwardly toward or from the central beam.

It is a further general object of my invention to improve and simplify the construction of agricultural machines of the type referred to, whereby the same is rendered highly efficient and reliable in practical operation, strong and durable in its construction, and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a plan view of my improved agricultural machine; Fig. 2 is a side elevation thereof; and Fig. 3 is a section taken on the line 3—3 of Fig. 1.

Referring in detail to the drawing, 1 designates the central supporting beam of the machine, the forward end of which is supported by a ground wheel 2 mounted in a suitable yoke having a standard 3 adapted to be adjustably connected to the beam by the bolts 4. To the beam 1, adjacent to the supporting wheel 2 and rearwardly thereof, the plow or other ground working tool 5 is securely fixed while a similar plow 6 is secured to the beam 1 adjacent to its rear end.

The beam 1, which preferably consists of a metal bar of requisite width and thickness, is twisted just rearwardly of the forward plow 5, as indicated at 22, to provide a horizontally disposed section therein. To this horizontal section of the beam, a transverse bar 8 is securely fixed by means of the bolts or rivets 7. To each end of this bar 8 a ground working plow or shovel 9 is suitably attached. A pair of longitudinally extending bars, indicated at 10 and 11, respectively, is arranged upon each side of the central beam 1. These bars are pivotally connected at their forward ends to the opposite ends of the transverse bar 8 and have their rear ends pivotally connected, as at 12, to the outer ends of a pair of toggle links 13. The other or inner ends of the corresponding links in each pair are pivotally connected to each other by means of a short plate 14. These plates extend longitudinally toward each other beneath the beam 1 and one of said plates is pivotally connected, as at 15, to the lower end of a lever 16 which is fulcrumed intermediate of its ends, as at 17, upon one side of the beam 1. To the other or upper end of this lever, one end of a connecting bar 18 is pivotally attached.

19 designates a manually operable lever which is fulcrumed upon the beam 1, as at 20, and has its lower end connected by a pivot 21 to the other end of the connecting bar 18 and the other of the plates 14. This lever 19 carries the usual spring pressed dog for engagement with the teeth of a rack 23 fixed upon the beam.

Between the parallel bars 10 and 11, a pair of transversely disposed levers 24 are pivotally mounted, as shown at 25, and said levers are connected upon opposite sides of the respective bars 10 and 11 by means of the link bars 26. Upon the outer ends of the transverse bars 24, ground working plows or shovels 27 are suitably mounted. A rack 28 is fixed upon the bars 10 and 11 and an arm 29 depends from each of said racks. Upon the arm 29, the lower end of a lever 30 is pivotally mounted and this lever is also pivotally connected, as indicated at 31, to one of the connecting links 26 between the levers 24. The levers 30 carry suitable dogs for locking engagement with the respective racks 28. It will be understood that, by the manipulation of the levers 30, the pairs of ground working plows upon opposite sides of the central beam can be angularly adjusted with respect to the line of movement of the machine. When it is desired to plow or cultivate the soil upon opposite sides of a plant row, the lever 20 is actuated which, through its connection with the oppositely extending pairs of toggle links, spreads the longitudinal supporting bars 10 and 11 apart or draws the same together into closer relation to the central beam 1. In this manner, it will be understood that a great range of adjustment of the ground working implements may be obtained so that the usefulness of the machine in practical every-day work will be greatly enhanced. It is, of course, apparent that a greater number of the relatively adjustable gangs of plows, indicated at 27, can be employed if desired, and while I have disclosed in the drawing a particular mounting of these plow gangs upon opposite sides of the central beam of the machine, other constructions which will admit of the proper angular adjustment of the implements may be substituted therefor.

It is also to be understood that, while I have herein referred to the present preferred construction and arrangement of the several elements employed, the machine is susceptible of considerable modification in these respects and I, therefore, reserve the privilege of adopting all such legitimate changes as may be fairly embodied within the spirit and scope of the invention as claimed.

Having thus fully described my invention, what I desire to claim and secure by Letters Patent is:—

In a machine of the character described, the combination of a beam, a transversely disposed bar fixed to said beam, longitudinally extending side bars pivotally mounted upon said transverse bar at their forward ends and arranged upon opposite sides of the beam, toggle link connections between the rear ends of said bars extending under the beam, manually operable means mounted upon the beam and connected to the toggle links to move the same and force said bars toward or from the central beam, and a plurality of ground working implements mounted upon each of said side bars and means for independently adjusting the implements on each of said side bars an angularly position the same with respect to the line of movement of the machine.

In testimony whereof I affix my signature in the presence of two witnesses.

ANTAL BORBÉLY.

Witnesses:
ANDREW C. KELLER,
E. T. SUDERBACK.

Copies of this patent may be obtained for five cents each, by addressing the "Commissioner of Patents, Washington, D. C."